US012581373B2

(12) United States Patent
Jeong et al.

(10) Patent No.: US 12,581,373 B2
(45) Date of Patent: Mar. 17, 2026

(54) METHOD AND APPARATUS FOR AREA MANAGEMENT IN AN NTN

(71) Applicant: Samsung Electronics Co., Ltd., Suwon-si (KR)

(72) Inventors: Kyeongin Jeong, Allen, TX (US); Nishithkumar D. Tripathi, Parker, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 667 days.

(21) Appl. No.: 17/730,070

(22) Filed: Apr. 26, 2022

(65) Prior Publication Data

US 2022/0353760 A1 Nov. 3, 2022

Related U.S. Application Data

(60) Provisional application No. 63/192,258, filed on May 24, 2021, provisional application No. 63/183,319, filed on May 3, 2021.

(51) Int. Cl.
*H04W 36/00* (2009.01)
*H04W 36/14* (2009.01)

(52) U.S. Cl.
CPC ........ *H04W 36/0061* (2013.01); *H04W 36/14* (2013.01)

(58) Field of Classification Search
CPC ............. H04W 36/0061; H04W 36/14; H04W 36/008355; H04W 36/0085; H04W 36/083; H04W 48/18; H04W 84/06
See application file for complete search history.

(56) References Cited

U.S. PATENT DOCUMENTS

| | | | |
|---|---|---|---|
| 9,843,892 B2 | 12/2017 | Hietalahti et al. | |
| 2006/0084443 A1 | 4/2006 | Yeo et al. | |
| 2015/0004970 A1 | 1/2015 | Venkatachari et al. | |
| 2016/0302118 A1 | 10/2016 | Yiu et al. | |
| 2021/0068013 A1* | 3/2021 | Cheng ................... | H04W 48/18 |
| 2021/0143900 A1* | 5/2021 | Edge ..................... | H04W 64/00 |
| 2021/0212014 A1* | 7/2021 | Gao ...................... | H04W 48/12 |
| 2022/0030478 A1 | 1/2022 | Shi et al. | |
| 2022/0132383 A1* | 4/2022 | Shrestha ............ | H04B 7/18513 |

(Continued)

FOREIGN PATENT DOCUMENTS

WO 2020114276 A1 6/2020

OTHER PUBLICATIONS

"5G; NR; Physical channels and modulation (3GPP TS 38.211 version 16.5.0, Release 16)", ETSI TS 138 211 V16.5.0, Apr. 2021, 138 pgs.

(Continued)

*Primary Examiner* — Dady Chery

(57) ABSTRACT

Methods and apparatuses for area management in a wireless communication system. A method of operating a UE comprises: receiving a first neighboring cell list and a second neighboring cell list; determining a priority between an NTN and a TN; and prioritizing the first neighboring cell list or the second neighboring cell list in a cell selection or reselection operation based on the priority. The first neighboring cell list includes one or more NTN cells and the second neighboring cell list includes one or more TN cells.

22 Claims, 10 Drawing Sheets

(56)        References Cited

U.S. PATENT DOCUMENTS

2023/0102334 A1*    3/2023   Roy .................... H04W 36/06
                                                          370/316
2023/0269635 A1*    8/2023   Xu ...................... H04W 48/20
                                                          370/329

OTHER PUBLICATIONS

"5G; NR; Multiplexing and channel coding (3GPP TS 38.212 version 16.5.0 Release 16)", ETSI TS 138 212 V16.5.0, Apr. 2021, 155 pages.
"5G; NR; Physical layer procedures for control (3GPP TS 38.213 version 16.5.0 Release 16)", ETSI TS 138 213 V16.5.0, Apr. 2021, 188 pages.
"5G; NR; Physical layer procedures for data (3GPP TS 38.214 version 16.5.0 Release 16)", ETSI TS 138 214 V16.5.0, Apr. 2021, 173 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
"5G; NR; User Equipment (UE) procedures in idle mode and in RRC Inactive state (3GPP TS 38.304 version 16.4.0 Release 16)", ETSI TS 138 304 V16.4.0, Apr. 2021, 41 pages.
Extended European Search Report issued Jul. 5, 2024 regarding Application No. EP22799059.5, 11 pages.
Thales, "Idle mode procedures in NR NTN", 3GPP TSG-RAN WG2 Meeting #112-e, R2-2009255, Nov. 2020, 6 pages.
International Search Report and Written Opinion issued Aug. 9, 2022 regarding International Application No. PCT/KR2022/006165, 8 pages.
ZTE Corporation et al., "Consideration on system information and cell (re)selection in NTN", 3GPP TSG-RAN WG2 Meeting#111, R2-2006872, Aug. 2020, 6 pages.
LG Electronics Inc., "Report on email discussion [107#64][NTN] Cell Selection & reselection", 3GPP TSG-RAN WG2 Meeting #107bis, R2-1913953, Oct. 2019, 21 pages.

* cited by examiner

600

UE/gNB Assistance Information, Determination and Reporting of Area ID(s), Area ID Structure, SMA Mobility Event, UE Position UE/gNB Area Management Mechanisms UE/gNB Assistance Information, Area ID Structure, SMA Mobility Configuration, UE Position

900

Operator Policies, UE Capabilities, UE Configuration, Network Configuration

Management of TN-NTN Mobility

Selected Network Type, Measurement Report, Selected HO/CHO Cell

METHOD AND APPARATUS FOR AREA MANAGEMENT IN AN NTN

CROSS-REFERENCE TO RELATED APPLICATIONS AND CLAIM OF PRIORITY

The present application claims priority to U.S. Provisional Patent Application No. 63/183,319, filed on May 3, 2021, and U.S. Provisional Patent Application No. 63/192,258, filed on May 24, 2021. The content of the above-identified patent document is incorporated herein by reference.

TECHNICAL FIELD

The present disclosure relates generally to wireless communication systems and, more specifically, the present disclosure relates to area management in a non-terrestrial network (NTN).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to area management in an NTN.

In one embodiment, a user equipment (UE) in a wireless communication system is provided. The UE comprises a transceiver configured to receive a first neighboring cell list and a second neighboring cell list and a processor operably coupled to the transceiver, the processor configured to: determine a priority between an NTN and a terrestrial network (TN), and prioritize the first neighboring cell list or the second neighboring cell list for a cell selection or reselection operation based on the priority. The first neighboring cell list includes one or more NTN cells and the second neighboring cell list includes one or more TN cells.

In another embodiment, a base station (BS) in a wireless communication system is provided. The BS comprises a processor configured to generate a priority between an NTN and a TN and a transceiver operably coupled to the processor, the transceiver configured to transmit a first neighboring cell list and a second neighboring cell list. The first neighboring cell list or the second neighboring cell list is prioritized, based on the priority, for a cell selection or reselection operation, the first neighboring cell list including one or more NTN cells and the second neighboring cell list including one or more TN cells.

In yet another embodiment, a method of a UE in a wireless communication system is provided. The method comprises: receiving a first neighboring cell list and a second neighboring cell list; determining a priority between an NTN and a TN; and prioritizing the first neighboring cell list or the second neighboring cell list in a cell selection or reselection operation based on the priority. The first neighboring cell list includes one or more NTN cells and the second neighboring cell list includes one or more TN cells.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.5.0, "NR; Physical channels and modulation"; 3GPP TS 38.212 v16.5.0, "NR; Multiplexing and Channel coding"; 3GPP TS 38.213 v16.5.0, "NR; Physical Layer Procedures for Control"; 3GPP TS 38.214 v16.5.0, "NR; Physical Layer Procedures for Data"; 3GPP TS 38.321 v16.4.0, "NR; Medium Access Control (MAC) protocol specification"; 3GPP TS 38.331 v16.4.1, "NR: Radio Resource Control (RRC) Protocol Specification"; and 3GPP TS 38.304 v16.4.0, "NR; User Equipment (UE) procedures in idle mode and RRC inactive state."

Figure 1:
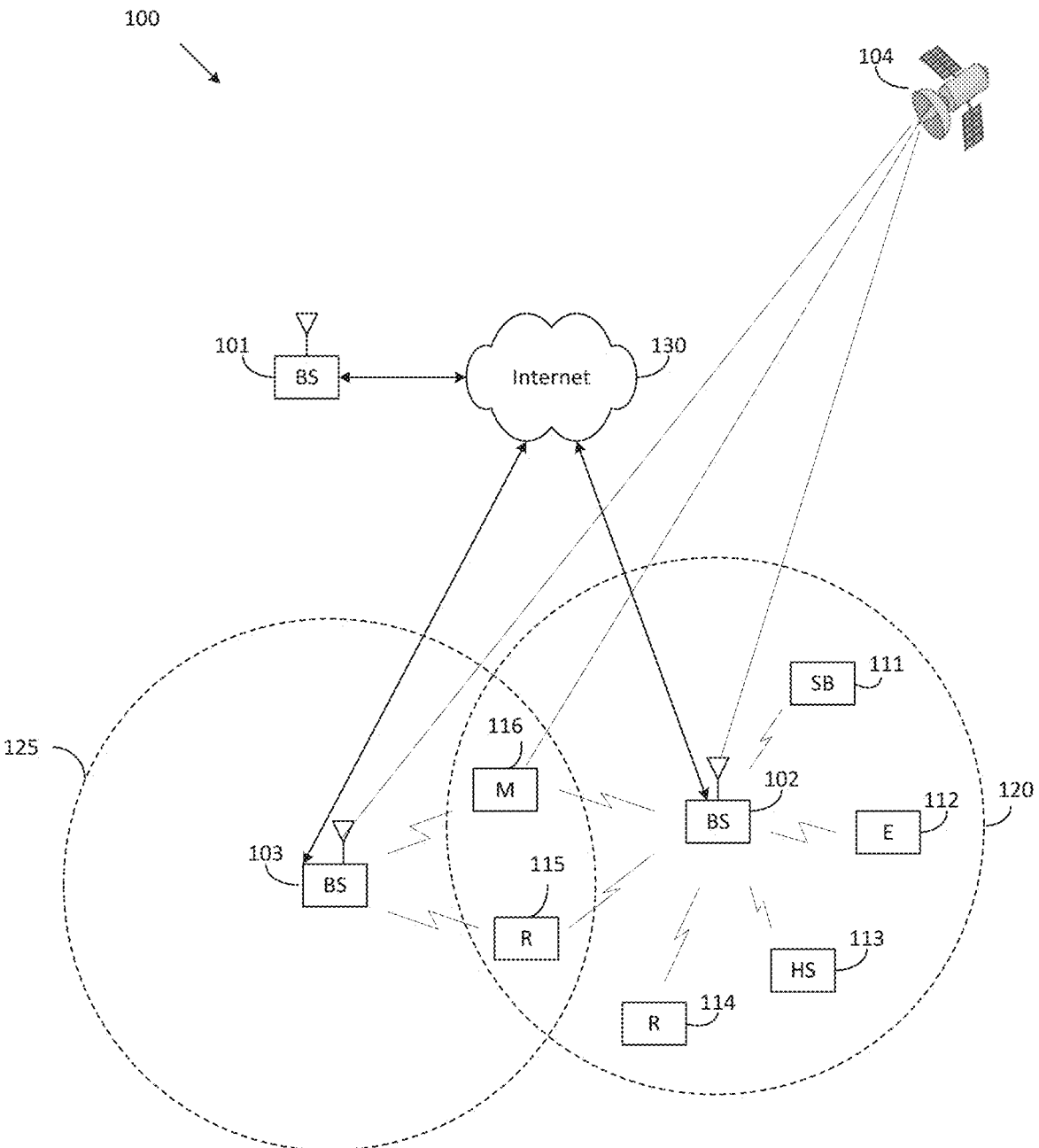
FIG. 1 illustrates an example of wireless network according to embodiments of the present disclosure.
Figure 2:
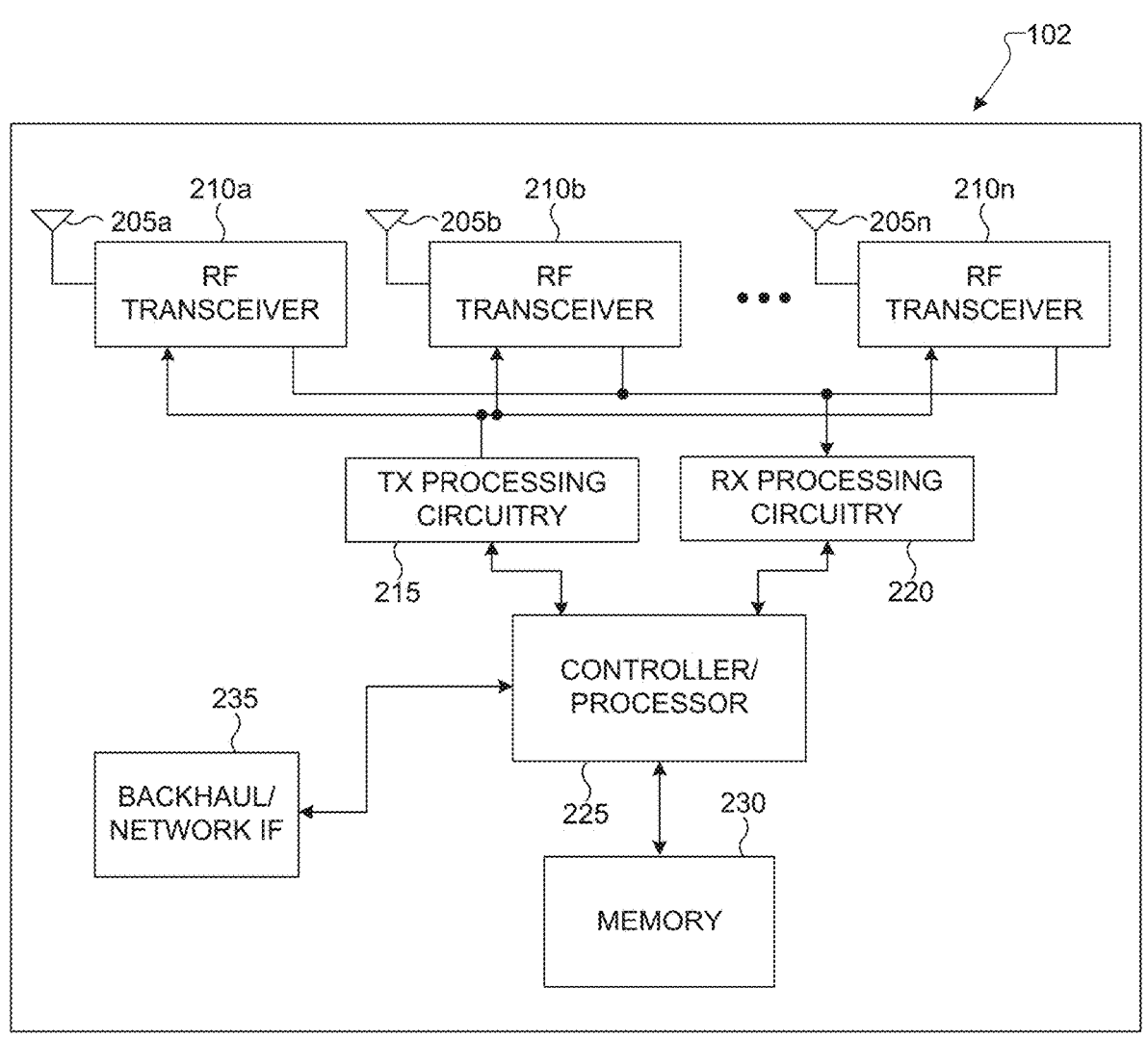
FIG. 2 illustrates an example of gNB according to embodiments of the present disclosure.
Figure 3:
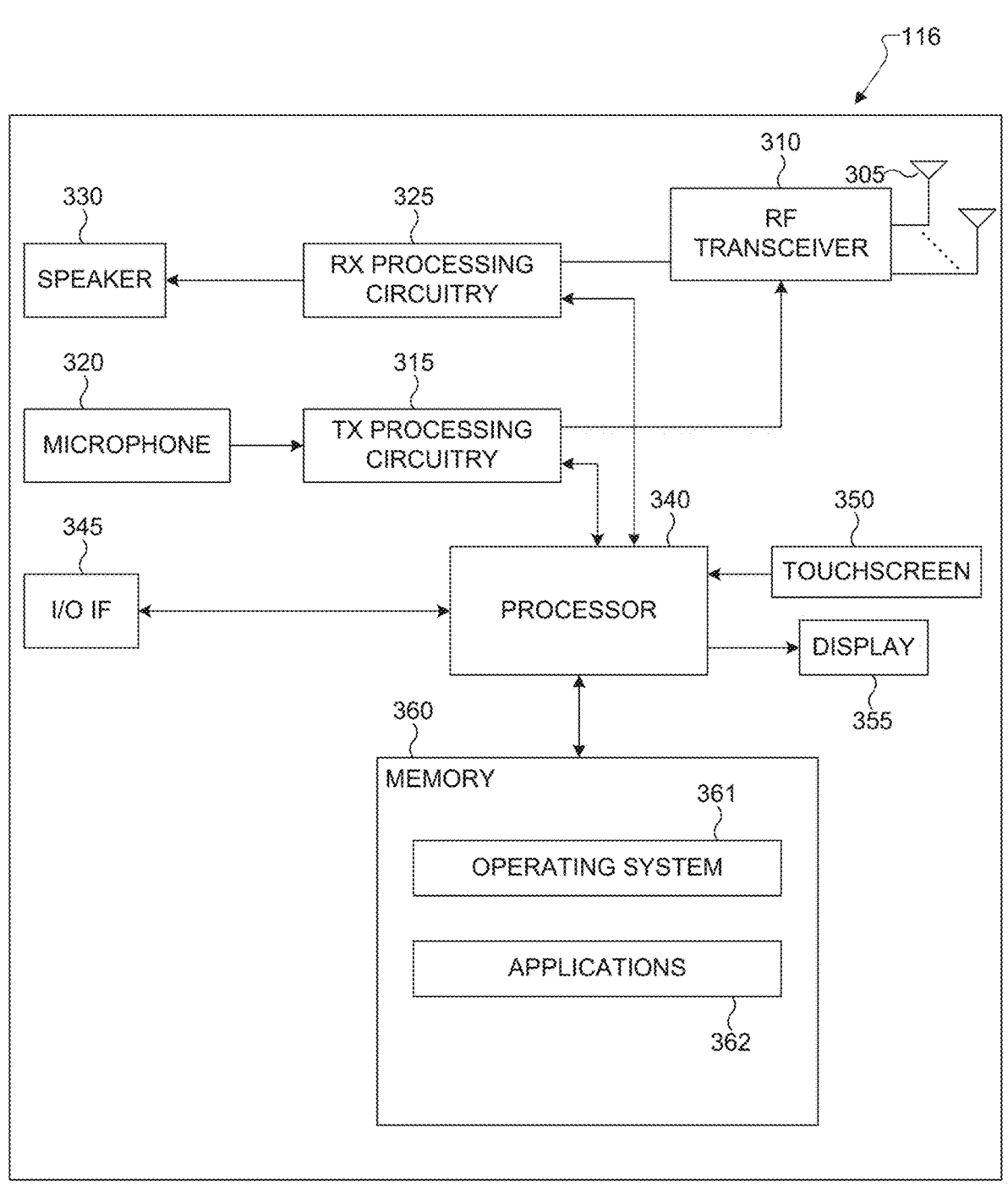
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, longterm evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As discussed in greater detail below, the wireless network 100 may have communications facilitated via one or more communication satellite(s) 104 that may be in obit over the earth. The communication satellite(s) 104 can communicate directly with the BSs 102 and 103 to provide network access, for example, in situations where the BSs 102 and 103 are remotely located or otherwise in need of facilitation for network access connections beyond or in addition to traditional fronthaul and/or backhaul connections. Various of the UEs (e.g., as depicted by UE 116) may be capable of at least some direct communication and/or localization with the communication satellite(s) 104, for example, to receive positional information or coordinates.

A non-terrestrial network (NTN) refers to a network, or segment of networks using RF resources on board a communication satellite (or unmanned aircraft system platform) (e.g., communication satellite(s) 104). Considering the capabilities of providing wide coverage and reliable service, an NTN is envisioned to ensure service availability and continuity ubiquitously. For instance, an NTN can support communication services in unserved areas that cannot be covered by conventional terrestrial networks, in underserved areas that are experiencing limited communication services, for devices and passengers on board moving platforms, and for future railway/maritime/aeronautical communications, etc.

As described in more detail below, one or more of the UEs 111-116 include circuitry, programing, or a combination thereof, for area management in an NTN. In certain embodiments, and one or more of the gNBs 101-103 includes circuitry, programing, or a combination thereof, for area management in an NTN.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support area management in an NTN. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for area management in an NTN. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
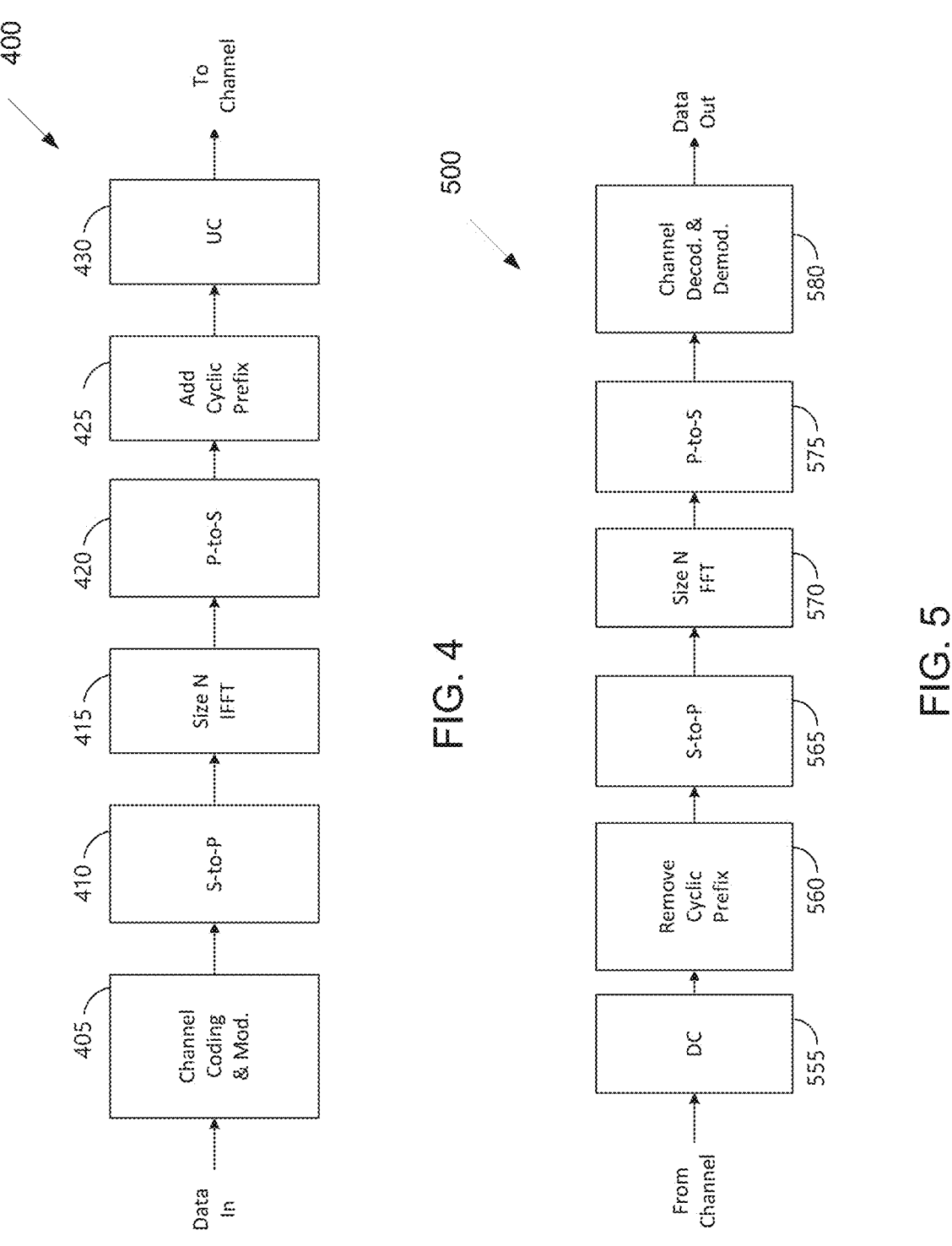
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

An NTN cell can be quite large with the diameter of hundreds of kilometers. In contrast, a TN cell is quite small, with the cell diameter on the order of tens of kilometers for macro cells, few kilometers for micro cells and tens of meters for small cells. To meet regulatory requirements (e.g., for law enforcement), there is a need to locate the UE in a geographic area with the accuracy that is similar to that for a TN.

Additionally, a UE physically located in a given country needs to be served by the core network in that country. The UE may move from one Tracking Area to another in the same NTN cell (which is not possible in a TN, because a cell does not span across multiple TAs in a TN). Such area related challenges need to be addressed while reducing the processing requirements at the UE and the gNB and the signaling overhead (e.g., system information block (SIB) and RRC signaling overhead).

To meet regulatory requirements (e.g., for law enforcement), there is a need to locate the UE in a geographic area with the accuracy that is similar to that for a TN. Additionally, a UE physically located in a given country needs to be served by the core network in that country. The UE may move from one Tracking Area to another in the same NTN cell (which is not possible in a TN, because a cell does not span across multiple TAs in a TN). Such area related challenges need to be addressed while reducing the processing requirements at the UE and the gNB and the signaling overhead (e.g., SIB and RRC signaling overhead).

The present disclosure defines an efficient area management for an NTN to locate with a TN cell-like granularity and manage transition areas to detect the UE movement in the transition areas while saving processing power at the UE and the gNB and reducing the signaling requirements.

Figure 6:
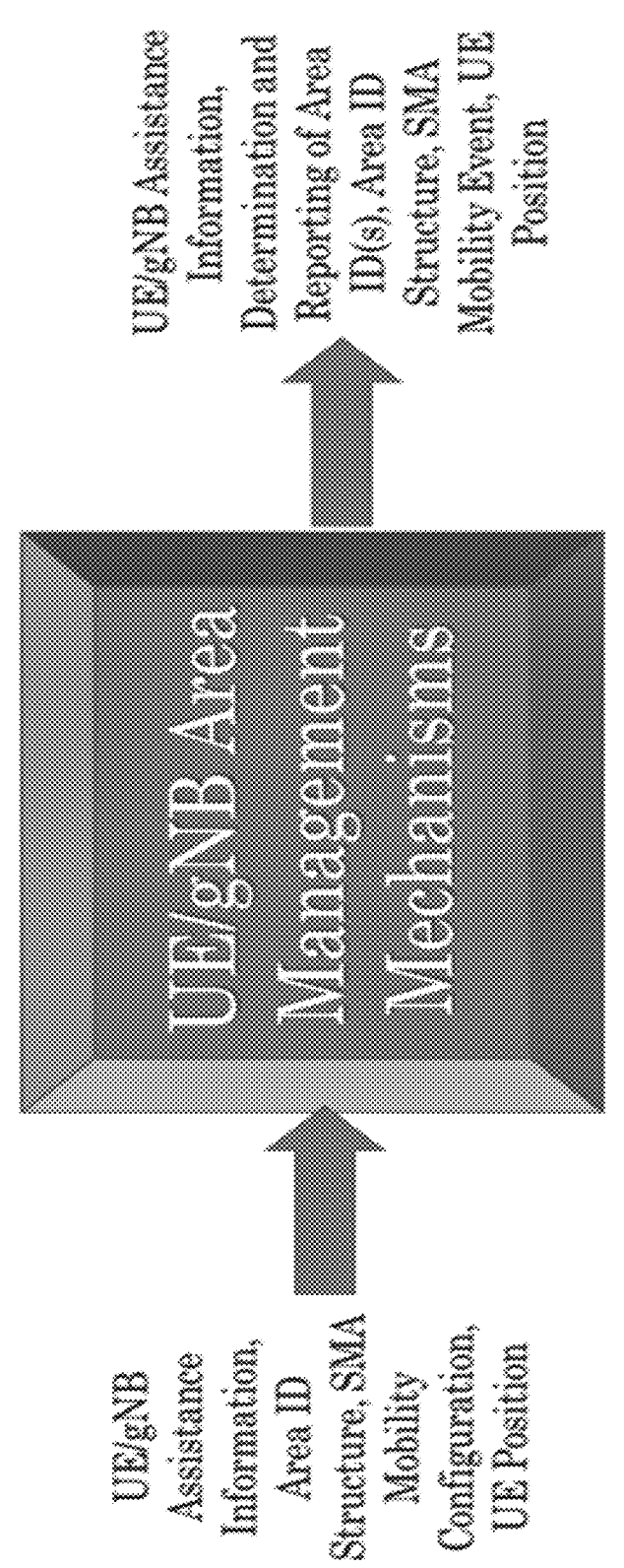
FIG. 6 illustrate an example of mechanism of area management for an NTN according to embodiments of the present disclosure.

FIG. 6 illustrate an example of mechanism of area management for an NTN 600 according to embodiments of the present disclosure. An embodiment of the mechanism of area management for an NTN 600 shown in FIG. 6 is for illustration only.

As illustrated in FIG. 6, the gNB, in on example (e.g., an implementation-specific manner), considers UE assistance information, an area identification (ID) structure, and a UE position to determine the SMA mobility configuration (e.g., special mobility area (SMA) reporting configuration) and identities of areas such as virtual cell ID and identities of special regions such as public land mobile network (PLMN) transition regions.

As illustrated in FIG. 6, the UE considers gNB assistance information, the area ID structure, the SMA mobility configuration, and the UE position to determine area ID(s) and possibly virtual cell IDs.

Figure 7:
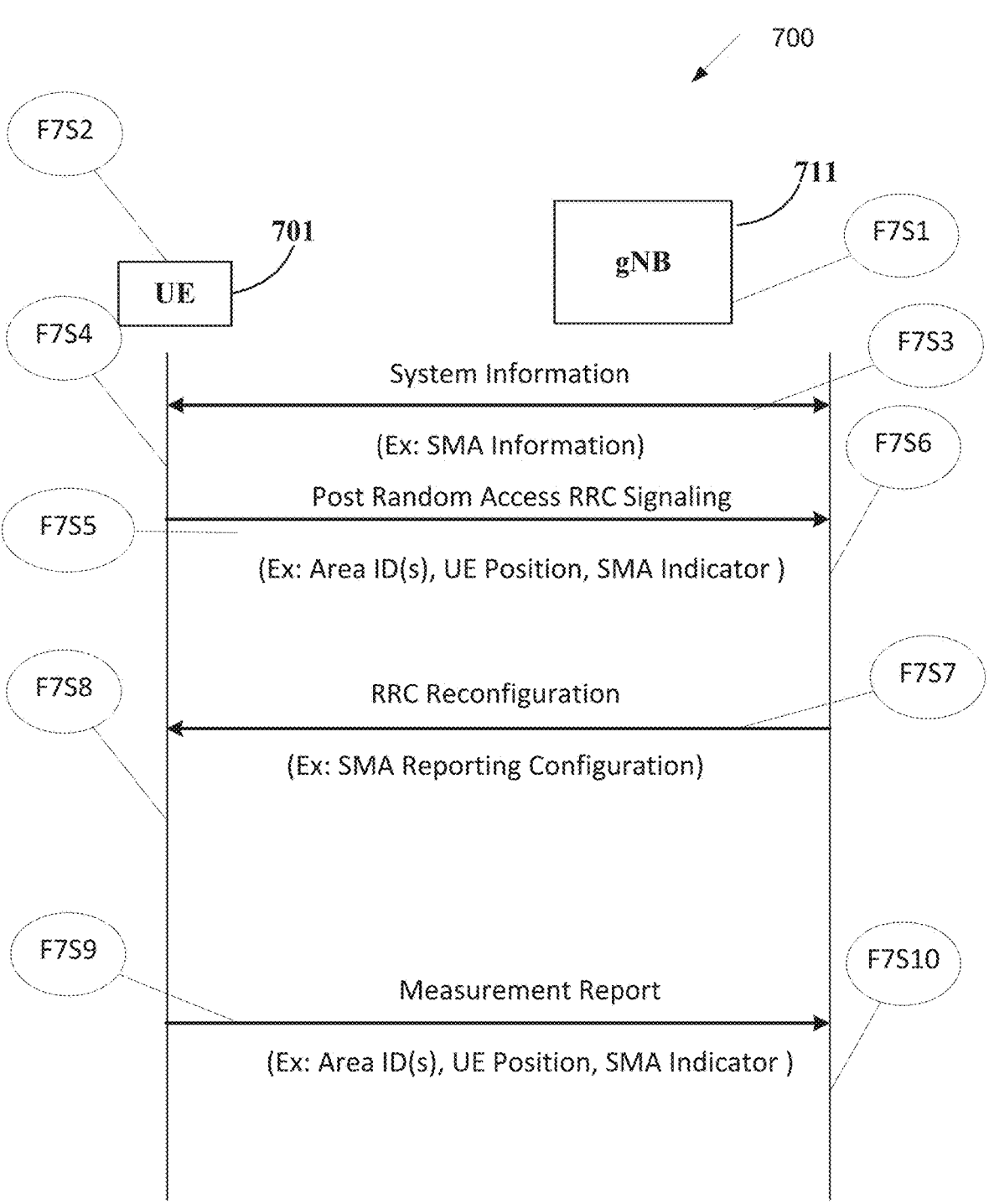
FIG. 7 illustrate a signaling flow for a UE-network procedure for area management in an NTN according to embodiments of the present disclosure.

FIG. 7 illustrate a signaling flow of a UE-network procedure 700 for area management in an NTN according to embodiments of the present disclosure. The UE-network procedure 700 as may be performed by a UE (e.g., 111-116 as illustrated in FIG. 1) and a base station (e.g., 101-103 as illustrated in FIG. 1). An embodiment of the UE-network procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, in Step F7S1, in one example, the gNB obtains the specifics of SMAs from a network function (NF) such as operations, administration, and maintenance (OAM), an application server (AS), or another suitable server.

In one example, an SMA is defined to be a geographic area where the PLMN transition occurs via a change in the mobile country code (MCC) (i.e., a change in the country due to the presence of a country border). In another example, an SMA is defined to be a geographic area where the PLMN transition occurs via a change in the MNC (i.e., one set of MNCs in one part of a geographic area and another set of MNCs in another part of the same geographic area).

In one embodiment, SMAs are identified by special region identities (SRIDs) to facilitate the identification of the region where the UE is currently located. For example, the RID may be part of an overall area identity (AID), and some range of RIDs can be reserved for SRIDs. The first few bits of the RID can represent an SRID. In one example, SRIDs designate the area with MCC change (e.g., the country border). In another example, SRIDs designate the area with the MNC change.

In one example, the AID is appended to the identity of a hierarchical area structure that utilizes multiple levels of areas such as a large area called a super area, a regular area such as Area, and a smaller area called sub-area. In another example, part or the whole of the super area can be used to define the AID. In yet another example, part or whole of the combined "super area and area" can be used to construct an AID.

In Step F7S2, the layout of the SMAs is given to the UE via provisioning (e.g., in SIM or memory). In another example, the layout of the SMAs is given to the UE via over-the-air application layer signaling (especially, any updates to the previously conveyed layout), which can be NTN signaling or TN signaling (e.g., Wi-Fi signaling or cellular network signaling.

In Step F7S3, the gNB broadcasts information related to SMAs in system information to facilitate the identification of NTN areas such as PLMN transition areas (PTAs) involving a change in the PLMN due to MCC and/or MNC changes. In one example, the gNB broadcasts SRIDs and/or RIDs that the gNB's cells are currently illuminating or may illuminate within a period of the gNB's choice. In one example, the gNB broadcasts in a SIB the IDs such as SRIDs and RIDs that the NTN cell may illuminate from the start of the SIB window till a specific instant in future (e.g., covering the SIB period of X ms such as 160 ms or longer including multiples of SIB periods).

In one example, the gNB broadcasts a set of coordinates that define the geographic areas associated with RIDs and SRIDs. In one example, centers of hexagonal regions (possibly made up of hexagonal virtual cells) are specified as coordinates.

In another example, a set of virtual cells correspond to a given SMA, with a PTA being a specific example of an SMA. The SRID then corresponds to the identity of the geographic area of the PTA.

In Step F7S3, the gNB includes a distance threshold that dictates if an idle/inactive mode UE may initiate a transition to the RRC_CONNECTED state and convey one or more of the are identities to the network.

In Step F7S3, the gNB includes parameters (smaEvaluationTimerInsideArea and smaEvaluationTimerOutsideArea) that specifies the periodicity with which a UE may evaluate a change in the UE's SMA. In one example, the smaEvaluationTimerInsideArea is smaller than the smaEvaluationTimerOutsideArea such that the UE evaluates the SMA change more frequently when the UE is inside the SMA (e.g., PTA where there is a possibility of the PLMN ID change due to MCC change or MNC change) and less frequently when the UE is outside the SMA.

In another embodiment, the periodicity of the SMA identification and/or SMA change evaluation is pre-defined in specifications instead of being specified via radio interface signaling.

In Step F7S3, the gNB provides an explicit or implicit indicator that the gNB's cell is or is about to illuminate an SMA. In one example, the gNB may distinguish between different types of SMAs such as an SMA involving the MCC change and an SMA involving the MNC change (but no MCC change).

In Step F7S3, the gNB broadcasts identities of virtual cells (i.e., hypothetical Earth-fixed cells) in the SMA(s).

In Step F7S4, the UE determines the RID/SRID based on the periodicity of the SMA evaluation.

If the idle/inactive mode UE has detected an SMA (e.g., PTA) change, the UE exits the idle/inactive mode and carries out random access to set up an RRC connection.

In Step F7S5, the UE conveys one or more of the following in a dedicated RRC signaling message and/or a non-access stratum (NAS) message: (1) a UE position; (2) identities of N closest areas (with N>=1) such as SRIDs; (3) distances between the UE and the geographic areas defined by RIDs and SRIDs; (4) identities of M closest virtual cells (with M>=1); (5) distances between the UE and M virtual cells; and/or (6) an SMA indicator that specifies whether the UE is inside a given SMA or not (based on the SMA-specific distance threshold specified by the gNB).

In one example, the UE conveys the UE's position but not the ID(s) of virtual cell(s). In another example, the UE conveys the ID(s) of virtual cell(s).

In Step F7S5, the UE uses an RRC message such as RRC setup complete and RRC reconfiguration complete.

In Step F7S5, the UE indicates a change in the SMA in an RRC message in one example. In another example, the UE indicates an entry into an SMA in an RRC message. In yet another example, the UE indicates a change in the SMA in a NAS message. In yet another example, the UE indicates an entry into an SMA in a NAS message.

In Step F7S5, compact identities or indices/indexes are used to reduce the signaling message size.

In Step F7S6, the gNB determines the identity/identities of the VCVCs by utilizing the UE position with the reported area ID(s) such as SRID(S). The gNB provides the VC ID(s) to the access and mobility management function (AMF) via a next generation application protocol (NGAP) signaling.

In Step F7S6, the gNB selects a new AMF if the PLMN ID has changed within the NTN cell as a result of the UE mobility relative to the SMA/PTA.

In Step F7S7, the gNB configures an RRC_CON-NECTED UE with SMA reporting configuration in one example. In another example, the gNB specifies a new SMA mobility handover event so that the UE sends a measurement report message to the gNB when an SMA change occurs. In another example, a new SMA mobility trigger is included in another NTN related measurement reporting event in support of handover in an NTN.

In Step F7S7, the gNB carries out suitable configuration for the UE such that the UE mobility across virtual cells does not trigger a measurement report but the UE mobility across SMAs/PTAs trigger such measurement report.

In Step F7S7, the gNB carries out suitable configuration for the UE such that the UE mobility across PLMNs (or equivalent PLMNs where the same operator has multiple MNCs for a given MCC) triggers a measurement report.

In Step F7S7, the gNB carries out suitable configuration for the UE such that the UE mobility across multiple TACs of the same PLMN operator (or equivalent PLMN operator where the same operator has multiple MNCs for a given MCC) does not trigger a measurement report. regions and their IDs (e.g., AIDs or SRIDs) are planned and provisioned in a suitable manner to facilitate such intra-NTN cell mobility management.

In Step F7S8, the UE determines the RID/SRID based on the periodicity of the SMA evaluation and occurrence of the SMA change based measurement reporting event or event trigger.

In Step F7S9, the UE sends a measurement report to the gNB and conveys one or more of the quantities specified in Step F7S7. In another example, traditional measurements of the serving cell and the neighbor cells are also included.

In Step F7S10, the gNB determines the identity/identities of the VC/VCs by utilizing the UE position with the reported area ID(s) such as SRID(S). The gNB provides the VC ID(s) to the AMF via NGAP signaling.

In Step F7S10, the gNB selects a new AMF if the PLMN ID has changed within the NTN cell as a result of the UE mobility relative to the SMA/PTA.

Figure 8:
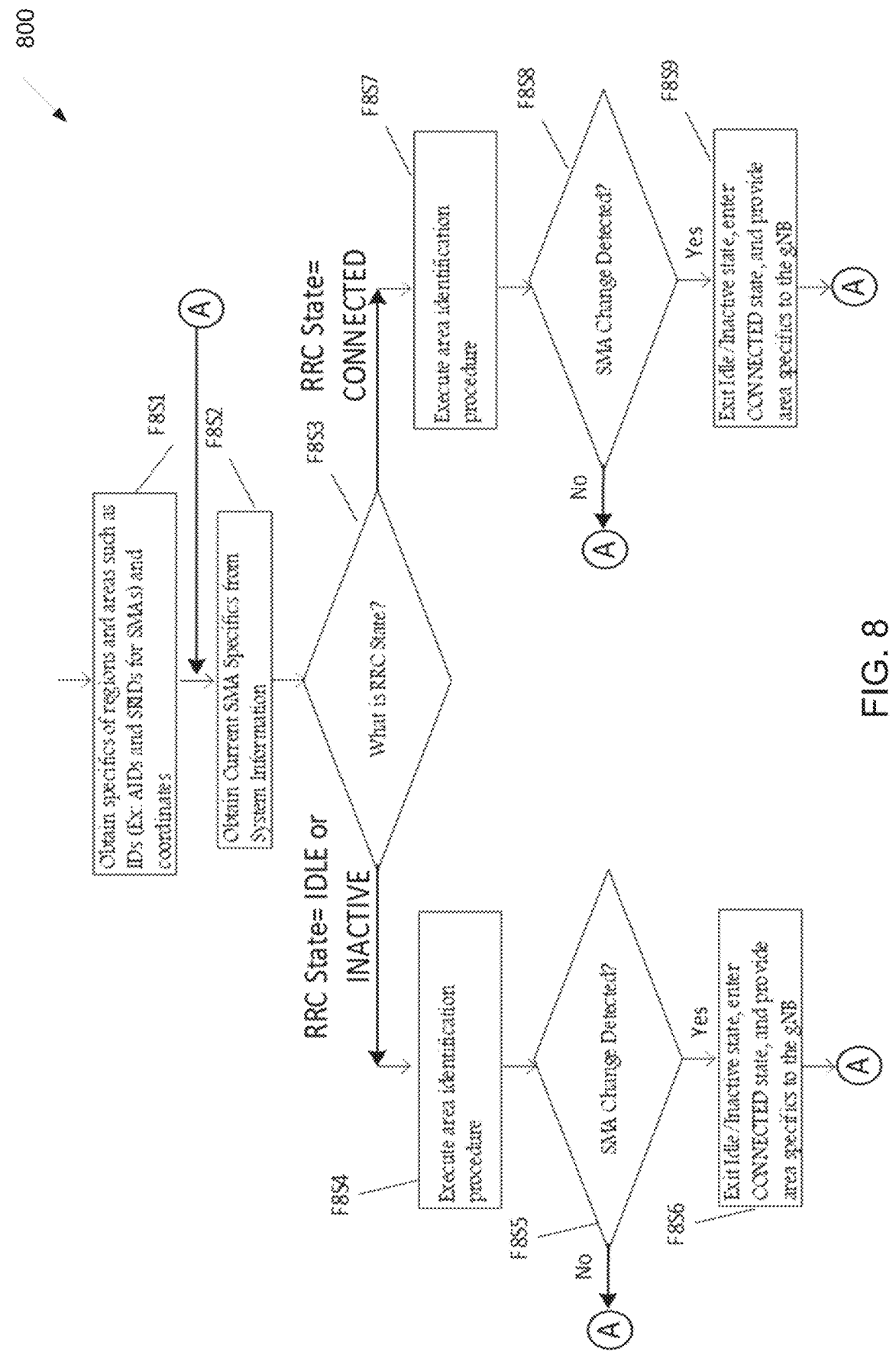
FIG. 8 illustrates a flowchart of a UE procedure for area management in an NTN according to embodiments of the present disclosure.

FIG. 8 illustrates a flowchart of a UE procedure 800 for area management in an NTN according to embodiments of the present disclosure. The UE procedure 800 as may be performed by a UE (e.g., 111-116 as illustrated in FIG. 1). An embodiment of the UE procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, in Step F8S1, the UE obtains the layout of the SMAs via provisioning (e.g., in SIM or memory). In another example, the UE obtains the layout of the SMAs via over-the-air application layer signaling (especially, any updates to the previously conveyed layout), which can be NTN signaling or TN signaling (e.g., Wi-Fi signaling or cellular network signaling.

In Step F8S2, the UE receives, via system information, the information related to SMAs so that the UE can identify NTN areas such as PLMN transition areas (PTAs) involving a change in the PLMN due to MCC and/or MNC changes, in one example, the UE receives SRIDs and/or RIDs in system information.

In Step F8S2, the UE receives a set of coordinates that defines the geographic areas associated with RIDs and SRIDs via system information.

In Step F8S2, the UE receives, via system information, a distance threshold (or a set of thresholds) that dictates if an idle/inactive mode UE may initiate a transition to the RRC_CONNECTED state.

In Step F8S2, the UE receives system information parameters (smaEvaluationTimerInsideArea and smaEvaluation-TimerOutsideArea) that specifies the periodicity with which a UE may evaluate a change in the SMA. In one example, smaEvaluationTimerInsideArea is smaller than smaEvaluationTimerOutsideArea such that the UE evaluates the SMA change more frequently when the UE is inside the SMA (e.g., PTA where there is a possibility of the PLMN ID change due to MCC change or MNC change) and less frequently when the UE is outside the SMA.

In another embodiment, the periodicity of the SMA identification and/or SMA change evaluation is pre-defined in specifications instead of being specified via radio interface signaling.

In Step F8S2, the UE receives, via system information, an explicit or implicit indicator that the cell is or is about to illuminate an SMA.

In Step F8S2, the UE receives identities of virtual cells (i.e., hypothetical Earth-fixed cells) in the SMA(s) via system information.

In Step F8S3, the UE checks the RRC state. If the RRC state is idle or inactive, the UE goes to Step F8S4. If the RRC state is CONNECTED, the UE goes to Step F8S7.

In Step FsS4, the idle/inactive UE executes the area identification procedure. The UE determines the RID/SRID based on the periodicity of the SMA evaluation.

In Step F8S5, the idle/inactive mode UE checks if an SMA change has occurred. If the SMA change has not occurred, the UE goes to Step F8S2. If the SMA change has occurred, the UE goes to Step F8S6.

In Step F8S6, the UE exits the idle/inactive mode and carries out random access to set up an RRC connection. The UE conveys one or more of the following in a dedicated RRC signaling message and/or a NAS message to the network: (1) a UE position; (2) identities of N closest areas (with N>=1) such as SRIDs; (3) distances between the UE and the geographic areas defined by RIDs and SRIDs; (4) identities of M closest virtual cells (with M>=1); (5) distances between the UE and M virtual cells; and/or (6) an SMA indicator that specifies whether the UE is inside a given SMA or not (based on the SMA-specific distance threshold specified by the gNB)

In one example, the UE conveys the position but not the ID(s) of virtual cell(s). In another example, the UE conveys the ID(s) of virtual cell(s).

In Step F8S6, the UE uses an RRC message such as RRC setup complete and RRC reconfiguration complete in one example.

In Step F8S6, the UE indicates a change in the SMA in an RRC message in one example. In another example, the UE indicates an entry into an SMA in an RRC message. In yet another example, the UE indicates a change in the SMA in a NAS message. In another example, the UE indicates an entry into an SMA in a NAS message.

In Step F8S6, compact identities or indices/indexes are used to reduce the signaling message size in one example.

After executing Step F8S6, the UE goes to Step F8S2.

In Step F8S7, the RRC_CONNECTED UE receives the SMA reporting configuration from the gNB in an RRC message such as RRC Reconfiguration message.

In Step F8S7, the UE receives a new SMA mobility handover event so that the UE sends a measurement report message to the gNB when an SMA change occurs. In another example, the UE receives a new SMA mobility trigger that is included in another NTN related measurement reporting event in support of handover in an NTN.

In Step F8S8, the RRC_CONNECTED UE checks if an SMA change has occurred. If the SMA change has not occurred, the UE goes to Step F8S2. If the SMA change has occurred, the UE goes to Step F8S9.

In Step F8S9, the UE conveys one or more of the following in a dedicated RRC signaling message and/or a NAS message to the network: (1) a UE position; (2) identities of N closest areas (with N>=1) such as SRIDs; (3) distances between the UE and the geographic areas defined by RIDs and SRIDs; (4) identities of M closest virtual cells (with M>=1); (5) distances between the UE and M virtual cells; and/or (6) an SMA indicator that specifies whether the UE is inside a given SMA or not (based on the SMA-specific distance threshold specified by the gNB).

In one example, the UE conveys the UE's position but not the ID(s) of virtual cell(s). In another example, the UE conveys the ID(s) of virtual cell(s).

In Step F8S9, the UE uses an RRC message such as measurement report in one example.

In Step F8S9, the UE indicates a change in the SMA in an RRC message in one example. In another example, the UE indicates an entry into an SMA in an RRC message. In yet another example, the UE indicates a change in the SMA in a NAS message. In another example, the UE indicates an entry into an SMA in a NAS message.

In Step F8S9, compact identities or indices/indexes are used to reduce the signaling message size in one example.

After executing Step F8S9, the UE goes to Step F8S2.

A network that a UE connects to may be a TN or an NTN. Furthermore, a UE may be capable of connecting to just one type of network at a time or multiple network types at the same time. Additionally, a UE may be capable of connecting to a single NTN platform type (e.g., geostationary orbit (GEO) only, low earth orbit (LEO) only, or high altitude platform systems (HAPS) only) or multiple NTN platform types (e.g., both GEO and LEO). When a UE is capable of connecting to a single network type (e.g., TN or NTN), the UE may be connected to one network type but may need to be moved to another network type. Hence, there is a need to prioritize the selection of the network at the UE the first time (e.g., after power up) or on a need basis (e.g., the UE leaving coverage area of one network type and/or entering the coverage area of another network type).

A solution is needed to manage the mobility of the UE across the TN and the NTN so that operator's requirements and UE capabilities are considered and the user can benefit from the service continuity across the TN and the NTN. The present disclosure defines mechanisms to manage the UE mobility across the TN and the NTN.

Without a suitable mechanism, the UE's mobility between a TN and an NTN may not be seamless, leading to poor user experience, increased UE power consumption (and hence reduced UE battery life) and/or unintended network utilization.

The present disclosure provides enhancements in the areas such as: (1) UE capability transfer, (2) network selection and reselection, (3) neighbor cell management; and (4) UE configuration in support of TN-NTN handover.

Figure 9:
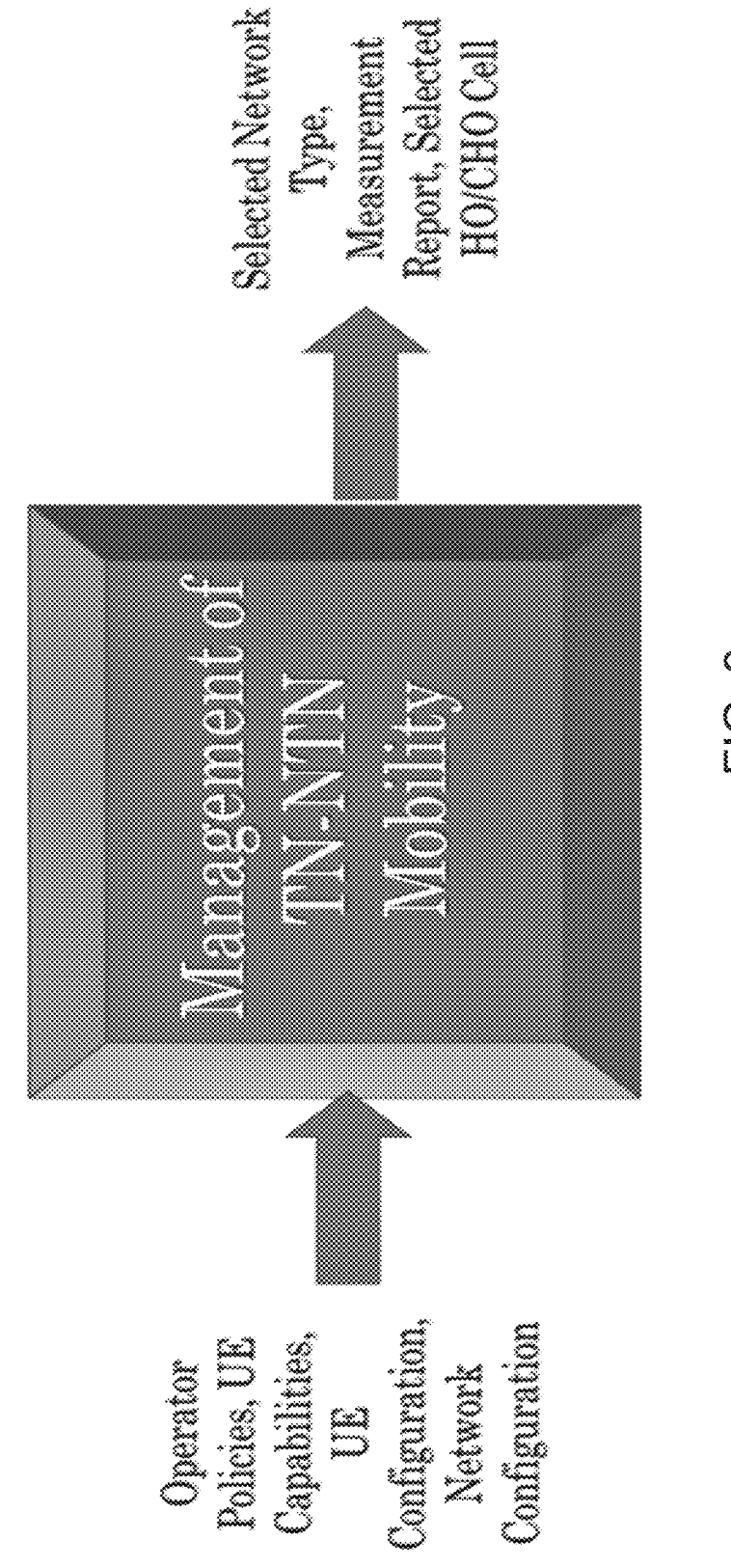
FIG. 9 illustrate an example of mechanism of TN-NTN mobility management according to embodiments of the present disclosure.

FIG. 9 illustrate an example of mechanism of TN-NTN mobility management 900 according to embodiments of the present disclosure. An embodiment of the mechanism of TN-NTN mobility management 900 shown in FIG. 9 is for illustration only.

As illustrated in FIG. 9, the UE considers factors such as operator policies (e.g., prioritization of one network type compared to another), UE capabilities (e.g., support for one network type at a time), UE configuration (e.g., triggers for a measurement report and conditional handover (CHO) execution conditions), and network configuration (e.g., classification of a neighbor cell into a TN cell or an NTN cell). The UE selects the network type and the HO/CHO cell, and the instant to send a measurement report to the gNB.

Figure 10:
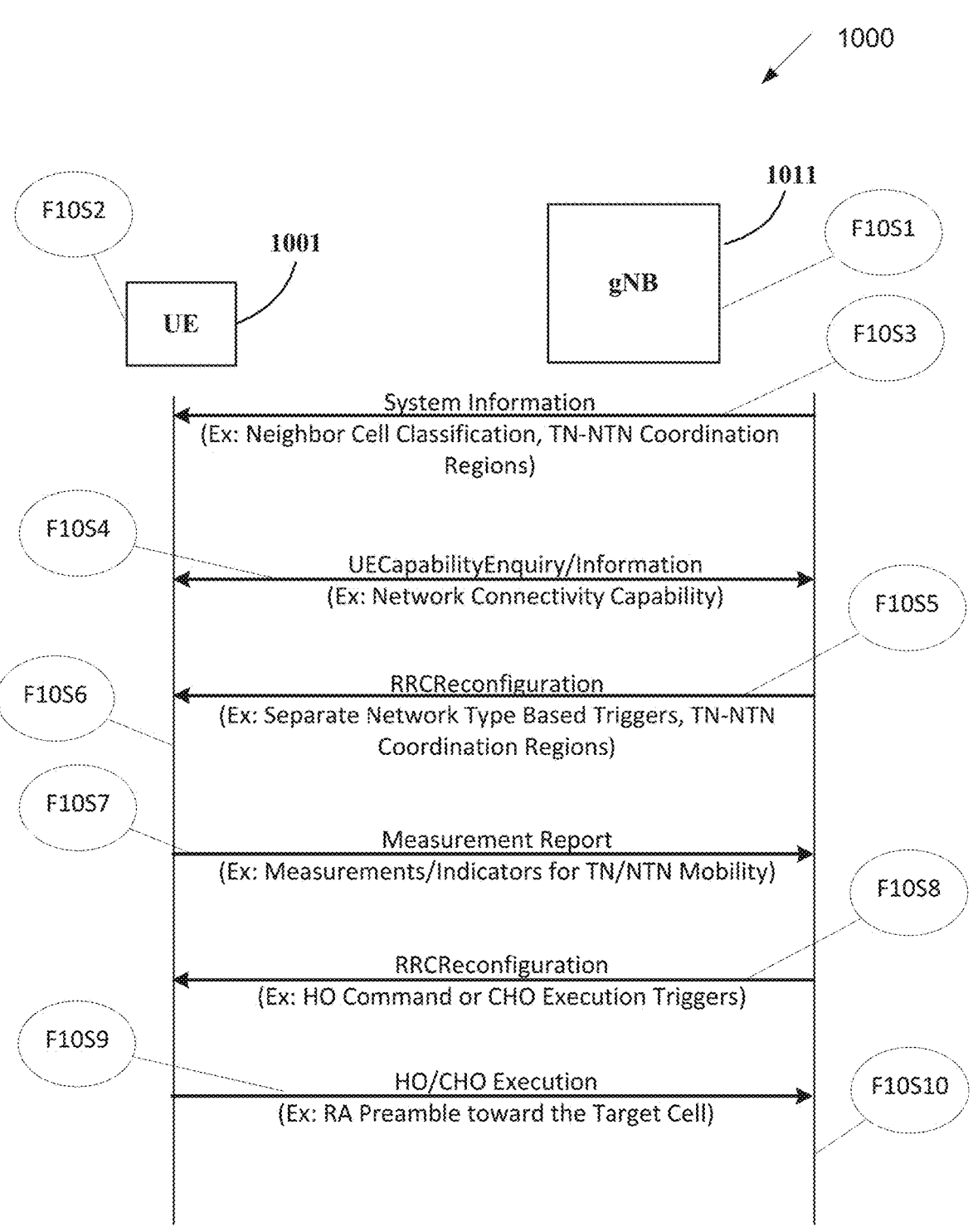
FIG. 10 illustrate a signaling flow for a UE-network procedure for TN-NTN management according to embodiments of the present disclosure.

FIG. 10 illustrate a signaling flow for a UE-network procedure 1000 for TN-NTN management according to embodiments of the present disclosure. The UE-network procedure 1000 as may be performed by a UE (e.g., 111-116 as illustrated in FIG. 1) and a BS (e.g., 101-103 as illustrated in FIG. 1). An embodiment of the UE-network procedure 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, in Step F10S1, the gNB is configured with suitable geographic regions as TN-NTN coordination regions where specific configurations are needed to ensure seamless mobility and service continuity for the UE during the UE's transition from a TN to an NTN or vice versa. Examples of TN-NTN coordination regions include airports, harbors, and TN coverage edge areas (i.e., the area where one part of the area is served by a TN and another part is not served by an NTN). The TN-NTN coordination regions may be small or large.

In Step F10S1, the gNB is configured with different classes of neighbor cells for a given serving cell. In one example, all TN cells are classified into one class and grouped together in system information and RRC signaling messages, and all NTN cells are classified into another class and grouped together in system information and RRC signaling messages. In another example, each neighboring cell or a group of neighboring cells is configured with an indicator informing whether the indicator indicates NTN cell(s) or TN cell(s). In another example, different classes correspond to different NTN platforms such as GEO, medium earth orbit (MEO), LEO, HAPS, and air-to-ground (ATG).

In Step F10S2, the UE is configured by the service provider with priorities for the TN and the NTN (including the priority for an NTN platform type). In one example, a TN is prioritized over an NTN so that the UE selects TN class neighboring cell(s) (or a TN class neighboring cell list) whenever a TN neighboring cell is available (e.g., even with relatively low reference signal received power (RSRP)) regardless of the status of the NTN class neighboring cells (or an NTN class neighboring cell list) (i.e., good or poor quality signal). It means the UE prioritize TN class neighboring cell(s)(or a TN class neighboring cell list) in performing measurement on neighboring cells and evaluating cell reselection criterion. How the UE prioritize a certain class of neighboring cells in the measurement and evaluation of cell reselection criterion is specified in TS 38.304. In another example, an NTN is prioritized over an NTN so that the UE selects NTN class neighboring cell(s)(or an NTN class neighboring cell list) whenever an NTN neighboring cell is available (e.g., even with relatively low RSRP) regardless of the status of the TN class neighboring cells (or a TN class neighboring cell list) (i.e., good or poor quality signal). It means the UE prioritize TN class neighboring cell(s)(or a TN class neighboring cell list) in performing measurement on neighboring cells and evaluating cell reselection criterion. How the UE prioritize a certain class of neighboring cells in the measurement and evaluation of cell reselection criterion is specified in TS 38.304. In yet another example, an NTN and a TN have equal priority and a suitable rule is used to select a TN or an NTN (e.g., using higher RSRP or other thresholds that are more stringent compared to the case of a prioritized network). The priority for the TN and NTN can be configured by an RRC protocol, by NAS protocol, by user's manual selection, or by pre-configuration.

In Step F10S3, the gNB broadcasts system information that includes classification of neighbors into TN neighbors or NTN neighbors. In another embodiment, an indication of the TN-NTN coordination region is included in system information. In another example, the identity of the TN-NTN coordination region is also specified in system information. In yet another example, the type of the TN-NTN coordination region (e.g., airport or harbor) is also conveyed by the gNB in system information.

In one embodiment, the TN-NTN coordination region is configured using one or more earth-fixed areas such as (hypothetical) virtual cells or logical cells. In another example, the TN-NTN coordination region is configured using one or more earth-fixed tracking areas. In another example, the TN-NTN coordination region is configured using the GNSS-based geographical area location information, e.g., a list of {X, Y, Z} or {X, Y} wherein X indicates latitude, Y indicates longitude, and Z indicates altitude.

In Step F10S3, the neighbor classification is specified by the gNB only in TN-NTN coordination regions.

In Step F10S3, the existence of the TN-NTN coordination region is conveyed to UEs implicitly or explicitly. In one example of implicit example, the use of information that implies whether the NTN cell is serving a TN-NTN coordination region or not is required.

In Step F10S3, one NTN cell (or beam) may include multiple regions or areas and only a subset of those regions (e.g., in the western part of a large NTN cell) may be a TN-NTN coordination region. In other words, one part of the NTN cell or beam may be a TN-NTN coordination region and another part of the NTN cell or beam may not be a TN-NTN coordination region. Such area granularity may enable UEs in non-TN-NTN coordination regions to avoid searching for neighbor cells of a different network type, saving precious UE battery life. It means a TN-NTN coordination region indicates the TN neighboring cell(s) is/are applied to the UE if the UE is in an NTN serving cell and the UE is located within a TN-NTN coordination region. Otherwise, the TN neighboring cell(s) is/are not applied to the UE, which means the UE does not need to consider the TN neighboring cell(s) as the candidate cell(s) for cell reselection (or the UE does not need to perform the measurements on the TN neighboring cell(s)).

In Step F10S4, the gNB and the UE exchange UECapabilityEnquiry/Information messages. In one embodiment, the UE informs the gNB if the UE can connect to only one network type or multiple network types at a given time. In one example, the UE specifies to the gNB if the UE can connect to only a TN or an NTN at a given instant. In another example, the UE specifies to the gNB if the UE can connect to both a TN and an NTN simultaneously.

In one embodiment, the UE specifies to the core network (e.g., the AMF) via NAS signaling if the UE can connect to only one network type or multiple network types at a given time. In one example, the UE specifies to the AMF in a NAS message (e.g., registration request, service request, and UL NAS transport messages) if the UE can connect to only a TN or an NTN at a given instant. In another example, the UE specifies to the AMF in a NAS message if the UE can connect to both a TN and an NTN simultaneously. In one example, the UE may specify the support for TN-NTN connectivity along with the support for the NTN platform types (e.g., GEO, MEO, LEO, HAPS, and ATG).

In Step F10S5, the gNB sends RRCReconfiguration message to the UE to specify separate network type-based triggers. In one example, the gNB specifies one measurement report trigger when the neighbor cell is a TN cell and another measurement report trigger when the neighbor cell is an NTN cell.

In Step F10S5, in the RRCReconfiguration message, the gNB specifies a higher neighbor RSRP threshold for a trigger for the case of the neighbor cell being a TN cell and a lower neighbor RSRP threshold for a trigger for the case of the neighbor cell being an NTN cell.

In Step F10S5, the gNB specifies the identity of a specific TN-NTN coordination region. In another example, the gNB may simply specify an indicator that a UE is in a TN-NTN coordination region or if the UE may be in a TN-NTN coordination region.

In Step F10S5, the gNB configures the UE with periodic reporting of the neighbor cell measurements (especially the neighbors of a different network type) to accelerate the process of handover, the identity of a specific TN-NTN coordination region. In another example, the gNB may simply specify an indicator that a UE is in a TN-NTN coordination region or if the UE may be in a TN-NTN coordination region.

In Step F10S6, the UE searches for neighbors of one network type ("first" network type) with one periodicity and neighbors of a different network type ("second" network type) with another periodicity (which can be same as, larger than, or smaller than the periodicity for the first network type).

In Step F10S6, the UE sets the network type based on the user's selection on the device. For example, around the time of a plane taking off or the ship/vessel leaving the harbor, the user may choose a setting on the smartphone (similar to "airplane mode") that indicates the need for a new network type. The UE, in one example, notifies the network (the gNB and the AMF) about such network selection so that the network can make any adjustments to the UE configuration.

Such notification may take the form of an indication in an RRC message, a new RRC message, a MAC control element (MAC CE) indication, or a measurement report. For NAS signaling, NAS messages such as a registration request and UL NAS transport can be used by the UE to inform the AMF about such network type or network connectivity change.

In Step F10S7, the UE sends a measurement report identifying the measurements of neighbors for one or more type of the network. The UE may indicate the need for mobility across the network types explicitly or implicitly (e.g., by reporting specific trigger identity).

In Step F10S8, the gNB sends RRCReconfiguration message to the UE to send a handover command to the UE in case of traditional handover and CHO execution triggers in case of CHO.

In Step F10S9, the UE sends an RA preamble to the target cell specified on the handover command in support of traditional handover and sends an RA preamble to the selected CHO cell when a CHO execution condition is satisfied.

In Step F10S10, the gNB informs the core network (e.g., AMF) about the UE's mobility across two network types. In one example, the gNB may choose a different AMF that is customized for a given network type (or even the NTN platform type).

In one embodiment, after learning about the UE's mobility across the network types, the AMF sends an updated tracking area identifier (TAI) list to the UE using a NAS message such as a configuration update command. Note that the signaling in F10S3 is applied to the UE in an idle state or an RRC inactive state, and the signaling in F10S4, F10S5, F10S7, F10S8, and F10S9 are applied to the UE in RRC connected state.

Figure 11:
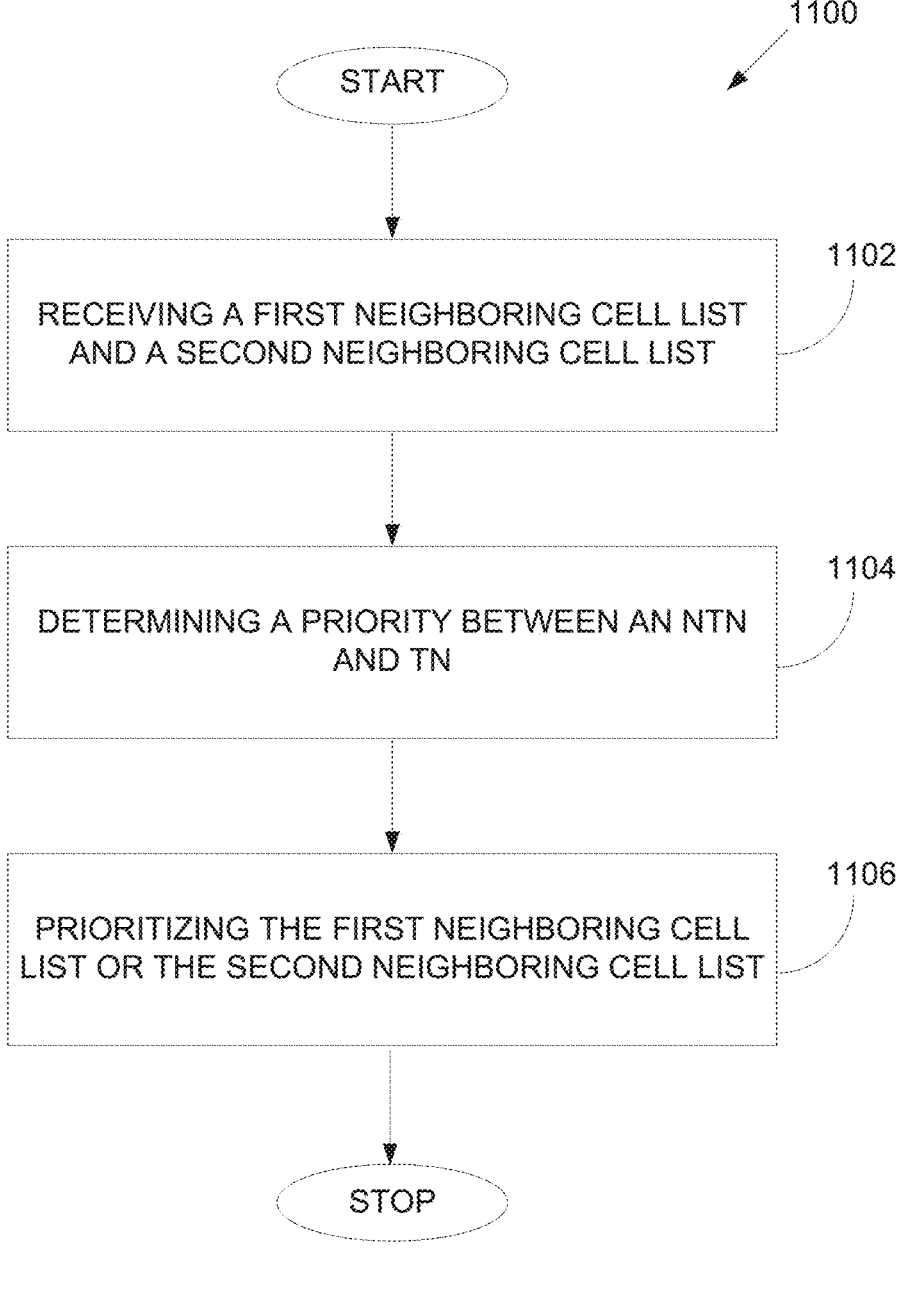
FIG. 11 illustrates a flow chart of method for UE procedure for area management in an NTN according to embodiments of the present disclosure.

FIG. 11 illustrates a flow chart of method 1100 for a UE procedure for area management in an NTN according to embodiments of the present disclosure. The method 1100 as may be performed by a UE (e.g., 111-116 as illustrated in FIG. 1). An embodiment of the UE method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, the method 1100 begins at step 1102. In step 1102, the UE receives a first neighboring cell list and a second neighboring cell list. In step 1102, the first neighboring cell list includes one or more NTN cells and the second neighboring cell list includes one or more TN cells.

Subsequently, in step 1104, the UE determines a priority between an NTN and a TN.

In step 1104, the priority between the NTN and the TN is determined based on configuration information received from a BS or pre-configured information.

Finally, in step 1106, the UE prioritizes the first neighboring cell list or the second neighboring cell list in a cell selection or reselection operation based on the priority.

In one embodiment, the UE receives an SIB or an RRC message. In such embodiment, the SIB or the RRC message includes the first neighboring cell list and the second neighboring cell list and the RRC message comprises an RRC reconfiguration message.

In one embodiment, the UE identifies a type of NTN among the first neighboring cell list, wherein the type of NTN comprises a GEO system, a MEO system, an LEO system, a HAPS, or an ATG system.

In one embodiment, the UE prioritizes the first neighboring cell list for the cell selection or reselection operation based on a determination that the NTN has a higher priority than the TN or prioritizes the second neighboring cell list for the cell selection or reselection operation based on a determination that the TN has the higher priority than the NTN.

In one embodiment, the UE determines whether a candidate cell for the cell selection or reselection operation is detected on first neighboring cells included in the prioritized first neighboring cell list.

In one embodiment, the UE performs a measurement operation and the cell selection or reselection operation on the first neighboring cells included in the prioritized first neighboring cell list based on a determination that the candidate cell for the cell selection or reselection operation is detected on the first neighboring cells included in the prioritized first neighboring cell list; or performs the measurement operation and the cell selection or reselection operation on second neighboring cells based on a determination that the candidate cell for the cell selection or reselection operation is not detected on the first neighboring cells included in the prioritized first neighboring cell list.

In one embodiment, the UE receives configuration information including a geographical area indication indicating that the UE is allowed to use the second neighboring cell list, wherein the geographical area indication comprise at least one of geo-location information, a cell ID, or a tracking area ID.

In one embodiment, the UE determines whether the UE is located in one or more NTN cells and in a geographical area included in the geographical area indication; and performs a measurement operation for the second neighboring cell list based on a determination that the UE is located in one or more NTN cells and in the geographical area.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising: a transceiver configured to receive a first neighboring cell list and a second neighboring cell list; and a processor operably coupled to the transceiver, the processor configured to: identify whether the UE is configured to connect to a single network type; determine a priority between a non-terrestrial network (NTN) and a terrestrial network (TN) based on a determination that the UE is configured to connect to the single network type, and prioritize the first neighboring cell list or the second neighboring cell list for a cell selection or reselection operation based on the priority, wherein the first neighboring cell list includes one or more NTN cells and the second neighboring cell list includes one or more TN cells.

2. The UE of claim 1, wherein the priority between the NTN and the TN is determined based on configuration information received from a base station (BS) or pre-configured information.

3. The UE of claim 1, wherein: the transceiver is further configured to receive a system information block (SIB) or a dedicated radio resource control (RRC) message; the SIB or the RRC message includes the first neighboring cell list and the second neighboring cell list; and the RRC message comprises an RRC reconfiguration message.

4. The UE of claim 1, wherein: the processor is further configured to identify a type of NTN among the first neighboring cell list; and the type of NTN comprises a geosynchronous earth orbiting (GEO) system, a medium earth orbit (MEO) system, a low earth orbit (LEO) system, a high altitude platform systems (HAPS), or an air-to-ground (ATG) system.

5. The UE of claim 1, wherein the processor is further configured to: prioritize the first neighboring cell list for the cell selection or reselection operation based on a determination that the NTN has a higher priority than the TN; or prioritize the second cell neighboring list for the cell selection or reselection operation based on a determination that the TN has the higher priority than the NTN.

6. The UE of claim 5, wherein the processor is further configured to: determine whether a candidate cell for the cell selection or reselection operation is detected on first neighboring cells included in the prioritized first neighboring cell list; and perform a measurement operation and the cell selection or reselection operation on the first neighboring cells included in the prioritized first neighboring cell list based on a determination that the candidate cell for the cell selection or reselection operation is detected on the first neighboring cells included in the prioritized first neighboring cell list; or perform the measurement operation and the cell selection or reselection operation on second neighboring cells based on a determination that the candidate cell for the cell selection or reselection operation is not detected on the first neighboring cells included in the prioritized first neighboring cell list.

7. The UE of claim 1, wherein: the transceiver is further configured to receive configuration information including a geographical area indication indicating that the UE is allowed to use the second neighboring cell list; and the geographical area indication comprises at least one of geo-location information, a cell identification (ID), or a tracking area ID.

8. The UE of claim 7, wherein the processor is further configured to: determine whether the UE is located in the one or more NTN cells and in a geographical area included in the geographical area indication; and perform a measurement operation for the second neighboring cell list based on a determination that the UE is located in the one or more NTN cells and in the geographical area; and not perform the measurement operation for the second neighboring cell list based on a determination that the UE is not located in the geographical area.

9. The UE of claim 1, wherein the transceiver is further configured to receive a system information block (SIB) message indicating an identity of a geographical region needing TN-NTN coordination, wherein the geographical region is configured using at least latitude information and longitude information.

10. A base station (BS) in a wireless communication system, the BS comprising: a processor configured to generate a priority between a non-terrestrial network (NTN) and a terrestrial network (TN); and a transceiver operably coupled to the processor, the transceiver configured to transmit a first neighboring cell list and a second neighboring cell list, wherein the first neighboring cell list or the second neighboring cell list is prioritized, based on the priority, for a cell selection or reselection operation, the first neighboring cell list including one or more NTN cells and the second neighboring cell list including one or more TN cells, and wherein the priority between the NTN and the TN is identified based on whether a user equipment (UE) is configured to connect to a single network type.

11. The BS of claim 10, wherein: the transceiver is further configured to transmit a system information block (SIB) or a dedicated radio resource control (RRC) message; the processor is further configured to generate a type of NTN among the first neighboring cell list, the type of NTN comprising a geosynchronous earth orbiting (GEO) system, a medium earth orbit (MEO) system, a low earth orbit (LEO) system, a high altitude platform systems (HAPS), or an air-to-ground (ATG) system; the priority between the NTN and the TN is determined based on configuration information transmitted to a user equipment (UE) or pre-configured information at the UE; and the SIB or the RRC message includes the first neighboring cell list and the second neighboring cell list, the RRC message comprising an RRC reconfiguration message.

12. The BS of claim 10, wherein, the processor is further configured to: generate the priority for the first neighboring cell list for the cell selection or reselection operation when the NTN has a higher priority than the TN; or generate the priority for the second cell neighboring list for the cell selection or reselection operation when the TN has the higher priority than the NTN.

13. The BS of claim 10, wherein: the transceiver is further configured to transmit configuration information including a geographical area indication indicating that the UE is allowed to use the second neighboring cell list; the geographical area indication comprises at least one of geo-location information, a cell identification (ID), or a tracking area ID; a UE location is determined whether the UE is located in the one or more NTN cells and in a geographical area included in the geographical area indication; a measurement operation is performed for the second neighboring cell list based on a determination that the UE is located in the one or more NTN cells and in the geographical area; and the measurement operation is not performed for the second neighboring cell list based on a determination that the UE is not located in the geographical area.

14. The BS of claim 10, wherein the transceiver is further configured to transmit a system information block (SIB) message indicating an identity of a geographical region needing TN-NTN coordination, wherein the geographical region is configured using at least latitude information and longitude information.

15. A method of a user equipment (UE) in a wireless communication system, the method comprising: receiving a first neighboring cell list and a second neighboring cell list; identifying whether the UE is configured to connect to a single network type: determining a priority between a non-terrestrial network (NTN) and a terrestrial network (TN) based on a determination that the UE is configured to connect to the single network type; and prioritizing the first neighboring cell list or the second neighboring cell list in a cell selection or reselection operation based on the priority, wherein the first neighboring cell list includes one or more NTN cells and the second neighboring cell list includes one or more TN cells.

16. The method of claim 15, wherein the priority between the NTN and the TN is determined based on configuration information received from a base station (BS) or pre-configured information.

17. The method of claim 15, further comprising receiving a system information block (SIB) or a dedicated radio resource control (RRC) message, wherein: the SIB or the RRC message includes the first neighboring cell list and the second neighboring cell list; and the RRC message comprises an RRC reconfiguration message.

18. The method of claim 15, further comprising identifying a type of NTN among the first neighboring cell list, wherein the type of NTN comprises a geosynchronous earth orbiting (GEO) system, a medium earth orbit (MEO) system, a low earth orbit (LEO) system, a high altitude platform systems (HAPS), or an air-to-ground (ATG) system.

19. The method of claim 15, further comprising: prioritizing the first neighboring cell list for the cell selection or reselection operation based on a determination that the NTN has a higher priority than the TN; or prioritizing the second neighboring cell list for the cell selection or reselection operation based on a determination that the TN has the higher priority than the NTN.

20. The method of claim 19, further comprising: determining whether a candidate cell for the cell selection or reselection operation is detected on first neighboring cells included in the prioritized first neighboring cell list; and performing a measurement operation and the cell selection or reselection operation on the first neighboring cells included in the prioritized first neighboring cell list based on a determination that the candidate cell for the cell selection or reselection operation is detected on the first neighboring cells included in the prioritized first neighboring cell list; or performing the measurement operation and the cell selection or reselection operation on second neighboring cells based on a determination that the candidate cell for the cell selection or reselection operation is not detected on the first neighboring cells included in the prioritized first neighboring cell list.

21. The method of claim 15, further comprising receiving configuration information including a geographical area indication indicating that the UE is allowed to use the second neighboring cell list, wherein the geographical area indication comprises at least one of geo-location information, a cell identification (ID), or a tracking area ID.

22. The method of claim 21, further comprising: determining whether the UE is located in the one or more NTN cells and in a geographical area included in the geographical area indication; performing a measurement operation for the second neighboring cell list based on a determination that the UE is located in the one or more NTN cells and in the geographical area; and not performing the measurement operation for the second neighboring cell list based on a determination that the UE is not located in the geographical area.

* * * * *